May 5, 1964 — H. H. KOBRYNER — 3,131,984
PLUG-IN METER SOCKET
Filed Dec. 9, 1960 — 2 Sheets-Sheet 1
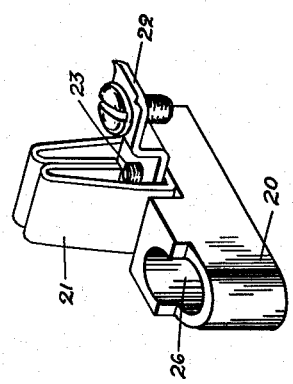
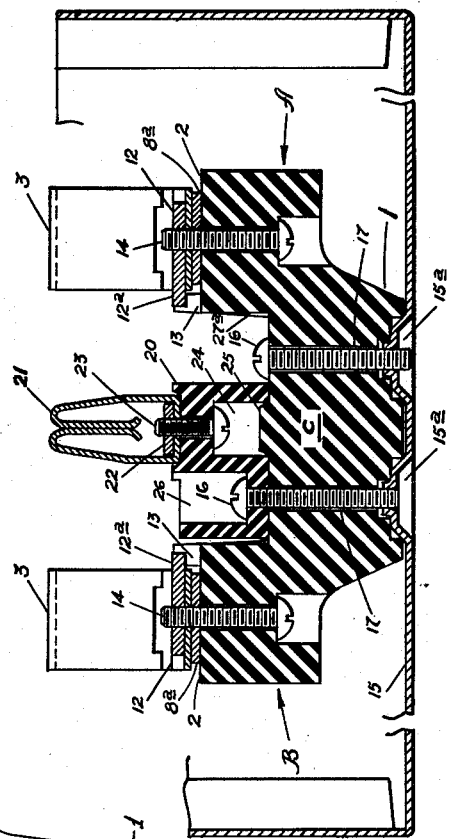
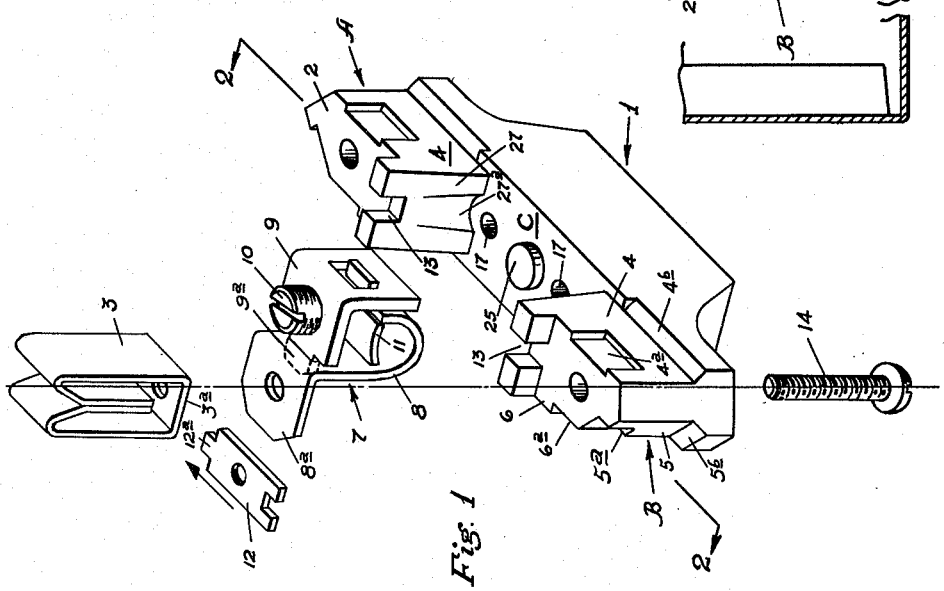
INVENTOR.
HERMAN H. KOBRYNER
BY Roy C. Hopgood
ATTORNEY May 5, 1964  H. H. KOBRYNER  3,131,984
PLUG-IN METER SOCKET Filed Dec. 9, 1960  2 Sheets-Sheet 2

INVENTOR.
HERMAN H. KOBRYNER
BY
Roy C. Hopgood
ATTORNEY

United States Patent Office 3,131,984
Patented May 5, 1964

3,131,984
PLUG-IN METER SOCKET
Herman H. Kobryner, Forest Hills, N.Y., assignor to Murray Manufacturing Corporation, Brooklyn, N.Y.
Filed Dec. 9, 1960, Ser. No. 74,980
5 Claims. (Cl. 339—31)

This invention relates to plug-in sockets for electric instruments and particularly for electric meters.

The plug-in socket for a meter involves a housed insulating base carrying a pattern of meter plug contactors and associated terminals. The number of contactors and their location pattern are determined by the number and location pattern of meter plugs. Thus, for a meter with four current plugs in a rectangular location pattern, the socket base is provided with a corresponding pattern of four plug contactors. The meter plugs are commonly contact blades and the contactors are usually blade jaws or clips for clasping the insertable meter blades. For each contact or current jaw of the socket, there is one wire connector terminal on the socket base.

Heretofore, the insulating base of the plug-in meter socket has been adapted to mount the terminal fittings, as well as the current jaws, in a single fixed location pattern. A single pattern of location of the terminal fittings is incapable of meeting widely differing socket wiring practices of utilities. Some utilities require the line wires to come through the top end wall of the socket box and the load wires to come through the bottom end wall; others prefer to bring both the load and the line wires to the socket terminals through the bottom end wall; some run a neutral wire through the center of the socket box, while others want the neutral wire at the side; some insist on the line wires going almost straight, without bends, to the terminals; others prefer to flare the wires at an angle to both sides of the socket base; and so on.

To satisfy the many variations in meter socket wiring practices of utilities, the socket manufacturers have heretofore been forced to make and stock a large variety of insulating bases, each different style for mounting the terminal fittings, as well as the current jaws, in a single location pattern unique to the particular wiring requirements of a user. This involves considerable inconvenience and cost to the manufacturer.

An object of this invention is to avoid the necessity of manufacturing and stocking a large variety of sockets to suit differing requirements of utilities and to provide a novel plug-in socket of universal adaptation to a large number of different utility requirements, particularly different terminal wiring practices.

The invention provides a plug-in socket adapted to variation in location patterns of the terminal fittings. Featured is an insulating base block with multi-faceted or polygonal ends each formed with a front seat for a plug contactor, specifically a blade contact jaw or clip, and with a plurality of lateral or side seats disposed at different angles with respect to one another around the block end. A terminal fitting is provided for optional seating on any of the side seats at a block end so as to occupy any of relatively angular positions around the end. The terminal fitting includes an extension, specifically a flat plate-form tongue which, in any of the optional positions of the terminal fitting around a block end, reaches over the front seat on the block end for surface attachment together with the base of a current jaw to the front seat, such attachment coincidentally locking the terminal fitting in its chosen seating position. Preferably, three terminal-positioning side seats are formed at each block end, two along relatively opposite sides of the block end and a third in oblique disposition at the rear of the block end.

Two of the novel base blocks are paired as components of a four-jaw socket to mount a meter with four current blades in a rectangular location pattern. The use of individual paired blocks facilitates accommodation of the location pattern of the four jaws to the location pattern of the meter blades. For each of the four jaws extending from the front seats at the opposite ends of the two base blocks, one terminal fitting is provided. By reason of the novel construction of the base blocks, the four terminal fittings can be optionally seated at the block ends in a substantial variety of location patterns, including symmetrical patterns.

Some meters include, in addition to contact plugs at the four corners of a rectangle, a fifth contact plug midway between a pair of the other plugs. For accommodating the fifth contact plug, some utilities convert a four-jaw socket to a five-jaw socket by adding a 5th (potential) jaw and terminal to an already installed socket. For such conversion, wires had to be disconnected and the socket base removed from the socket box. Then after the 5th jaw had been attached, the base assembly had to be remounted in the socket box and wires re-connected. To ease the conversion, some manufacturers have prefitted the socket base with a metal plate to which, when necessary, a 5th jaw and terminal could be attached with a screw. To supply each socket base with a metal fitting and screw for mounting a 5th jaw assembly regardless of whether or not such assembly is ever to be needed, is a wasteful cost burden.

An object of the invention is to avoid such cost burden by forming the socket base so that it is adapted for direct attachment thereto of a 5th jaw and terminal assembly, without requiring removal of the socket base. The 5th jaw and terminal assembly here provided comprises a contact jaw or clip, a terminal therefor, and an insulating block or platform on which the jaw and terminal are fastened. To attach this 5th jaw unit to the socket base, it is merely necessary to remove one of the screws holding a socket base block to the rear wall of the enclosure and to re-insert the screw through a shouldered hole in the 5th jaw platform and thence through the base block into the rear wall of the enclosure. The 5th jaw, as mounted, is oriented at a right angle to the longitudinal axis of the base block while the end jaws are in aligned orientation longitudinally of the block. Means are provided on the base block and the 5th jaw platform for enabling the 5th jaw unit to be set in either of two positions, without changing the location and orientation of the 5th jaw piece, one position extending the 5th jaw terminal fitting to one side of the base block and the other position bringing the terminal fitting to the other side of the block, whichever is most convenient to wiring.

In the specific exemplary embodiment of the invention, the socket base block is a molding with symmetrical protuberant ends bridged by a depressed section. Each protuberant end affords a raised deck for seating a current jaw and is formed with the plurality of relatively angularly disposed side seats for optional seating of a terminal fitting. The depressed section of the block is adapted for mounting the 5th jaw unit, when desired, with the platform of the 5th jaw unit in keyed abutment with either of the facing walls provided by the elevated block ends. Nut and bolt means are used to fasten a current jaw to the top of each elevated block end, the nut having non-rotative engagement with the block end and the base of the current jaw to preclude disorientation of the current jaw.

The above mentioned and other features and objects of this invention and the manner of attaining them will become more apparent and the invention itself will be best understood by reference to the following description of an embodiment of the invention taken in conjunction with the accompanying drawing, wherein:

FIG. 1 is an exploded perspective view of one of the socket base blocks and associated components as constructed according to the invention;

FIG. 2 is a section along lines 2—2 of FIG. 1 and showing further both end jaw units and a 5th jaw unit, assembled on the base block;

FIG. 3 is a perspective view of the 5th jaw unit by itself;

Figure 4:
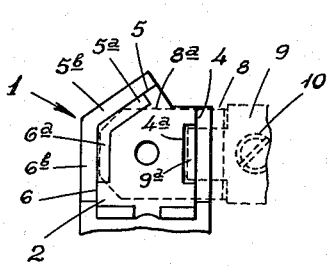
FIGS. 4, 5 and 6 are fragmentary plan views of one end of a base block and respectively show three different seated positions of an end terminal.

Referring to FIGS. 1 and 2, the novel socket base block comprises a molding 1 of insulating material, such as porcelain, formed with symmetrical protuberant polygonal ends A and B bridged by a depressed hull section C. Each protuberant end affords a deck surface 2 to serve as a front seat for a meter plug contactor which comprises, specifically, a current jaw or contact clip 3 formed, out of one piece, with a flat base 3a and jaw sides bent upwardly from the base and then reversely to constitute a blade receiving jaw couple. Each protuberant end of the block is formed laterally with three terminal-positioning side seats 4, 5 and 6 (also see FIGS. 4, 5 and 6) in relatively angular disposition around the block end. The side seat 4 comprises a flat surface along one side of the block end, a recess 4a interrupting the flat surface, and a beveled ledge 4b. The side seat 6 is formed with a flat surface along the opposite side of the block end, a recess portion 6a and a beveled ledge 6b. The side seat 5 is in oblique position at the butt of the block end and comprises a flat surface, a recessed portion 5a and a ledge 5b.

Figure 5:
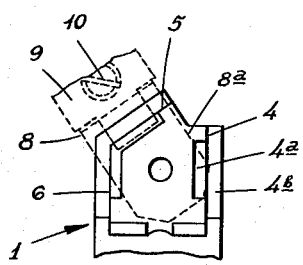
Figure 6:
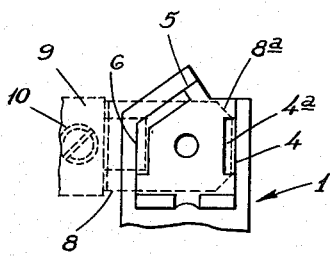
Figure 7:
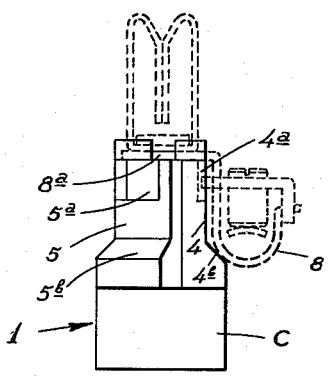
FIG. 7 is an end view of the block end and terminal arrangement as on FIG. 4 (but other end of block!)

Optionally positionable on any of the side seats 4, 5 and 6 is a wire connector terminal fitting generally designated 7. This terminal fitting comprises a lay-in wire cradle 8 and an angle member 9 having free tongue and slot fit on the cradle. A screw 10 is carried by the angle member 9 and is adjustable to tighten a clamp plate 11 down on a conductor wire in the bow of the cradle. Bent right angularly from the back of the cradle is an integral flat tongue extension 8a which, in each of the optional seated positions of the terminal fitting around a block end is cantilevered over the front seat 2 on the block end. The contour of the back of cradle 8 and the contiguous curve of the cradle bow is such as to nest into the angle between the flat face of any of the side seats and the beveled ledge of the seat. Thus, with the terminal fitting applied to the seat 4 (see FIGS. 4 and 7), the back of the cradle 8 is practically against the flat face of the seat and the cradle bow is on the ledge 4b. At the same time, the rear tongue 9a, of the angle member 9, extending through a slot in the back of the cradle 8, is accommodated by the seat recess 4a and coincidentally helps to locate the terminal fitting properly on the seat. Similarly, when the terminal fitting is mounted to the seat 5, as indicated in FIG. 5, the cradle 8 is nested in the angle between the flat face of the seat and the seat ledge 5b, while the tongue 9a intrudes into the recess 5a. In the FIG. 6 position of the terminal fitting, it nests in the angle between the flat of the seat 6 and the beveled ledge 6b and the tongue 9a intrudes into recess 6a.

The terminal fitting or line connector 7 is set on seat 4 or 6 when the conductor wire is to enter the connector parallel to one or the other long side of the base block 1. When the wire is to enter at an angle to the block, the connector terminal is set in the oblique seat 5.

In assembling a connector terminal 7 and blade jaw or clip 3 to an end of the block, the terminal is first fitted to the chosen side seat, with the terminal tongue 8a resting on the adjacent front seat surface 2. The jaw 3 is then placed on the terminal tongue and a nut 12 inserted in place between the sides of the jaw piece. The nut 12 is oblong for non-rotative engagement in the jaw piece and has a tongue 12a to engage a slot 13 of the block end, so as to maintain the jaw piece against turning on the block. A bolt 14 is inserted from the back of the block end, through a smooth hole therein, thence through registering holes in the terminal plate 8a and the jaw base and into the nut 12. Tightening of the bolt 14 fastens the terminal and jaw assembly securely in position, with the jaw virtually seated on the front seat 2 of the block end and the terminal firmly held to its chosen side seat.

Figure 8:
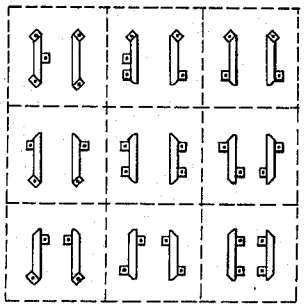
FIG. 8 is a chart schematically showing various possible symmetrical location patterns of end terminals for a four-jaw meter socket, the first two charted boxes also showing the alternative positions of the 5th jaw terminals.

To provide a four-jaw meter socket, two of the base blocks 1 assembled with the jaw and terminal components at their opposite ends are fastened in spaced side-by-side positions to the back wall of a socket box 15. A large number of different location patterns of the four terminals 7 at the opposite ends of the two base blocks is made possible by the optional seating positions of a terminal at each end, as provided by the invention. Preferably, symmetrical location patterns are used with respect to corresponding ends of the two base blocks in the four-jaw socket. Nine such possible symmetrical location patterns for the end terminals are shown in FIG. 8. As a rule, the two terminals at the ends of each of the two blocks in a four-jaw socket are used for the same polarity of line and load wires.

Each base block 1 is fastened in place by a pair of screws 16 inserted from the front of the block through holes 17 in the depressed hull section C of the block and into tapped bumps 15a of the back wall of the enclosure box 15. A 5th jaw sub-assembly is shown detached in FIG. 3. This 5th jaw sub-assembly includes an insulating platform 20, a blade jaw piece 21 thereon, and a terminal 22 which incorporates a nut portion fitting non-rotatively between the legs of the jaw piece 21, these parts being fastened together by a screw 23 within a counterbore 24 in the platform. The 5th jaw sub-assembly can be mounted upon the depressed hull section C of the block 1 by placing the counterbore 24 over a round knob 25 on the hull section and aligning a mounting hole 26 in the platform 20 with either of the holes 17, then inserting a screw 16 through the hole 26 and aligned hole 17 and into a threaded bump 15a in the back wall of the socket box 15. With the 5th jaw unit attached to the front of block section C, the rounded nose of the platform 20 intrudes into a groove 27a in a flanking end wall 27 of the section C, keying the 5th jaw unit in position. The 5th jaw unit can be set in either of two positions, 180 degrees apart, one position being against the block end A and the other position against the block end B. In one position, the 5th jaw terminal 22 is at one side of the block 1 and in the alternative position, the terminal is at the other side of the block, as indicated in the first two dotted boxes in FIG. 8. In either position, the orientation and location of the 5th jaw piece 21 is the same, at a right angle to the length of the base block and to the aligned lengthwise orientation of the end jaws 3.

It is to be noted that the height of the tapped bumps 15a of the back wall of the socket box and the length of screws 16 are so chosen that a screw 16 does not protrude behind the back wall of the socket box when the screw head is against the front of the block section C and still effectively threads into a bump 15a when used to mount the 5th jaw unit onto the block section C.

While the foregoing description sets forth the principles of the invention in connection with specific apparatus, it is to be understood that this description is made only by way of example and not as a limitation of the scope of the invention as set forth in the objects thereof and in the accompanying claims.

I claim:
1. A plug-in socket for an electric meter or the like of the type provided with knife blade contact elements, said socket including an enclosure, an insulating base block mounted therein and formed at each of opposite polygonal block ends with a front seat and also with a plurality of terminal-positioning side seats in relatively angular disposition around the block end, knife blade contact members respectively based on the front seats of the block ends and projecting forwardly therefrom for friction contact with the knife blade elements of the meter or the like, wire connector terminal fittings at the respective block ends, the terminal fitting at each said block end being optionally seated on any one of the side seats at the block end to occupy any of relatively angular positions around the block end, the terminal fitting at each said block end including a plate-form piece which in any of the optional relatively angular positions of the terminal fitting around the block end extends over the front seat at the block end for surface attachment together with the base of the adjacent knife blade contact member to the front seat, means for effecting the attachment of the plate-form piece of a terminal fitting and the base of a said knife blade contact member to the front seat at a block end and coincidentally locking the terminal fitting to the chosen side seat at that end, said block being formed between its ends with additional front seating means, an additional knife blade contact sub-assembly based on said additional front seating means for engagement by a supplemental knife blade contact element of the meter, and said sub-assembly comprising a contact jaw piece, a terminal fitting engaged therewith, and an insulating platform on which the jaw piece and its terminal fitting are fastened.

2. A plug-in socket as in claim 1, and means for mounting the additional knife blade contact device on the additional seating means with the knife blade contact thereof oriented at an angle relative to the orientation of the end knife blade contacts.

3. A plug-in socket as in claim 2, the end knife blade contact members being oriented in line with the end-to-end length of the block and the additional knife blade contact being oriented crosswise of the block length, and a connector terminal extending crosswise from the additional knife blade contact device to a side of the block.

4. A plug-in socket as defined in claim 3, the additional seating means and knife blade contact device having elements for coacting with each other and with said mounting means for optionally seating the knife blade contact device in either of two positions 180 degrees apart, in one position locating the connector terminal of the knife blade contact device to one side of the block and in the other position locating connector terminal to the opposite side of the block.

5. A plug-in socket as defined in claim 4, said block ends being formed with forwardly protruding recessed walls facing each other across the additional front seating means, and the additional knife blade contact device having a base intruding into the recess of one said wall when the knife blade contact device is in one of its two optional positions and intruding into the recess of the other wall when the knife blade contact device is in the other of the optional positions, so as to key the additional knife blade contact device into either chosen one of these positions.

References Cited in the file of this patent

UNITED STATES PATENTS

| | | |
|---|---|---|
| Re. 24,705 | Moore | Sept. 29, 1959 |
| 1,905,004 | Sachs | Apr. 25, 1933 |
| 2,015,112 | Johansson | Sept. 24, 1935 |
| 2,066,300 | Mylius | Dec. 29, 1936 |
| 2,534,449 | Johansson | Dec. 19, 1950 |
| 2,538,912 | Road et al. | Jan. 23, 1951 |
| 2,574,776 | Clapp | Nov. 13, 1951 |
| 2,691,693 | Lewis | Oct. 12, 1954 |
| 2,838,626 | Kuhn | June 10, 1958 |
| 2,924,805 | Lenehan | Feb. 9, 1960 |